United States Patent [19]
Kassouni

[11] Patent Number: 5,407,310
[45] Date of Patent: Apr. 18, 1995

[54] MOUNTING PLATE ASSEMBLY

[75] Inventor: Haig H. Kassouni, Grand Rapids, Mich.

[73] Assignee: Agape Plastics, Inc., Grand Rapids, Mich.

[21] Appl. No.: 123,293

[22] Filed: Oct. 19, 1993

[51] Int. Cl.⁶ .................. F16B 23/00; F16B 37/02; F16B 39/00
[52] U.S. Cl. .................. 411/107; 411/173; 411/377; 411/396; 411/999; 29/525.1
[58] Field of Search .............. 411/103, 107, 108, 377, 411/396, 383, 966, 970, 999, 173; 29/525.1

[56] References Cited

U.S. PATENT DOCUMENTS

| | | |
|---|---|---|
| D. 294,676 | 3/1988 | Egner et al. |
| 1,867,354 | 7/1932 | Dickson |
| 2,250,580 | 7/1941 | Gregory |
| 2,860,082 | 11/1958 | Murdock et al. |
| 2,933,006 | 4/1960 | Gibb |
| 3,485,132 | 12/1969 | Hanny et al. |
| 3,584,667 | 6/1971 | Reiland |
| 3,618,444 | 11/1971 | Kay et al. |
| 3,693,495 | 9/1972 | Wagner |
| 3,705,931 | 12/1972 | Confer et al. |
| 3,782,437 | 1/1974 | Seckerson ............ 411/970 X |
| 3,897,712 | 8/1975 | Black |
| 4,154,138 | 5/1979 | Melone |
| 4,211,048 | 7/1980 | Naka |
| 4,536,116 | 8/1985 | Murray |
| 4,753,560 | 6/1988 | Ryder ................ 411/377 |
| 5,020,951 | 6/1991 | Smith ............... 411/999 X |
| 5,094,579 | 3/1992 | Johnson ............ 411/999 X |
| 5,199,837 | 4/1993 | Goss ................ 411/377 |

FOREIGN PATENT DOCUMENTS

| | | |
|---|---|---|
| 834787 | 5/1960 | United Kingdom |
| 876106 | 8/1961 | United Kingdom |
| 1408532 | 10/1975 | United Kingdom |
| 2173564 | 10/1986 | United Kingdom |

*Primary Examiner*—Neill R. Wilson
*Attorney, Agent, or Firm*—Varnum, Riddering, Schmidt & Howlett

[57] ABSTRACT

A fastener-carrier system and method for securely fastening at least two mounted members utilizing the fastener-carrier system according to the invention is disclosed. The fastener-carrier system includes a fastener-carrier member having at least one threaded fastener and at least one lock member depending therefrom. The lock member preferably has a snap-lock head mounted on the terminal end thereof. The snap-lock head is adapted to temporarily mount the first and second mounted members to one another while at least one threaded nut is mounted to the at least one threaded fastener to securely mount the first and second mounted members to one another.

20 Claims, 5 Drawing Sheets

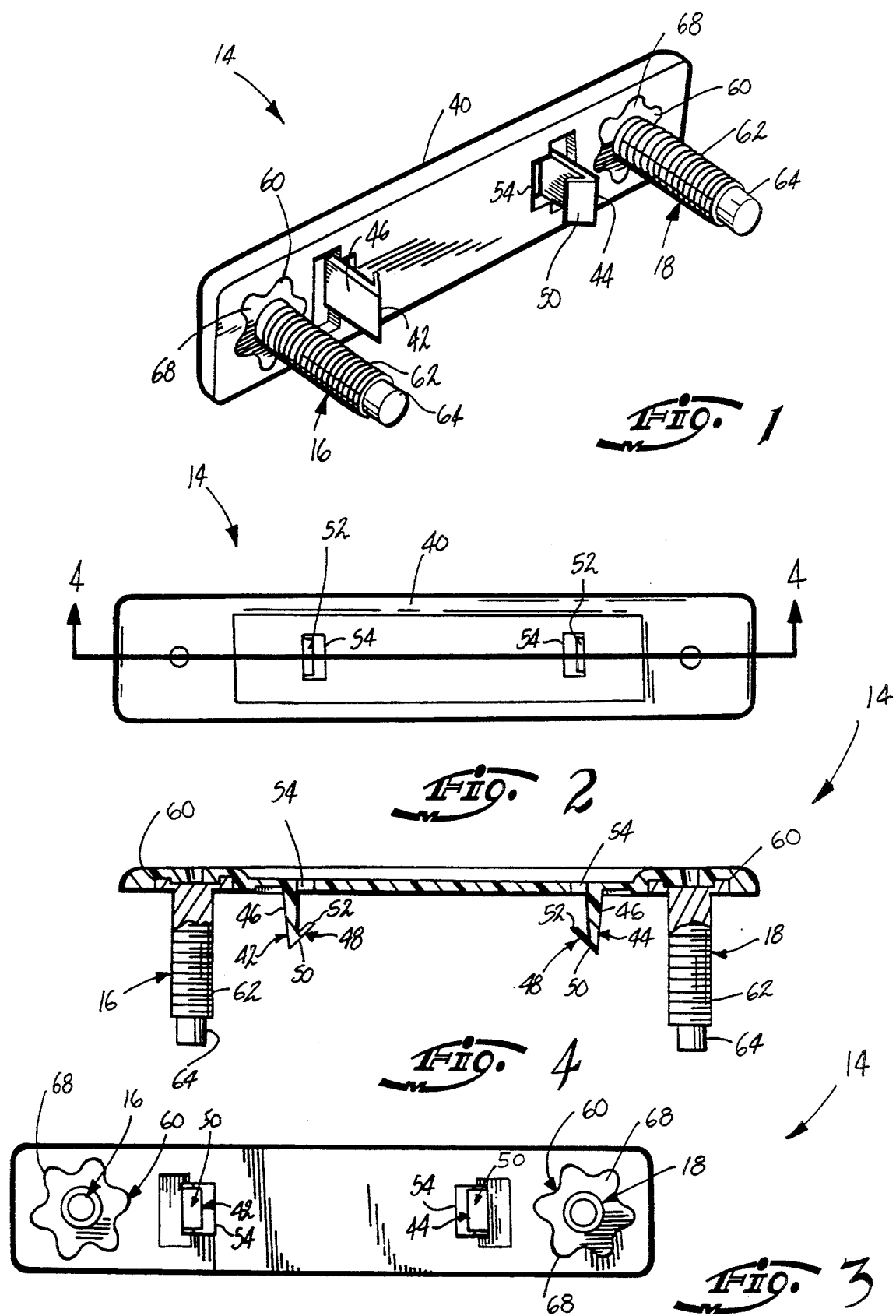

```
┌─────────────────────────────────────────┐
│   MOUNTING BOLTS AND SNAP LOCK MEMBERS  │
│ OF FASTENER-CARRIER MEMBER ARE INSERTED IN│
│     APERTURES OF FIRST MOUNTED MEMBER   │
└─────────────────────────────────────────┘
                    │
                    ▼
┌─────────────────────────────────────────┐
│     MOUNTING BOLTS AND SNAP LOCK MEMBERS │
│ OF FASTENER-CARRIER MEMBER/FIRST MOUNTED MEMBER │
│    ASSEMBLY ARE INSERTED IN APERTURES OF │
│           SECOND MOUNTED MEMBER          │
└─────────────────────────────────────────┘
                    │
                    ▼
┌─────────────────────────────────────────┐
│  LOCKING TABS OF SNAP LOCK MEMBERS ENGAGE│
│  EXPOSED SURFACE OF SECOND MOUNTED MEMBER│
│   TO SECURE THE FASTENER-CARRIER MEMBER, │
│   FIRST MOUNTED MEMBER AND SECOND MOUNTED│
│       MEMBER TOGETHER AS AN ASSEMBLY     │
└─────────────────────────────────────────┘
                    │
                    ▼
┌─────────────────────────────────────────┐
│     NUTS ARE THREADABLY MOUNTED ON THE   │
│      MOUNTING BOLTS OF THE FASTENER-     │
│    CARRIER MEMBER TO SECURELY MOUNT THE  │
│      FIRST AND SECOND MOUNTED MEMBERS    │
│              TO ONE ANOTHER              │
└─────────────────────────────────────────┘
```

Fig. 11

MOUNTING PLATE ASSEMBLY

BACKGROUND OF THE INVENTION

1. Field of the Invention

This invention relates to a mounting plate assembly which fastens one article to another and, more particularly, to a mounting plate having at least one snap-lock retaining member to temporarily secure the mounting plate to at least one of the mounted members.

2. Description of Related Art

Fastener-carrier systems used to mount two substantially planar workpieces to one another are currently used in the automotive industry for mounting a bumper to a support structure. One such fastener-carrier system is disclosed in UK Patent GB 2 173 564 published 14 Sep. 1988. The structure is assembled by inserting mounting bolts through appropriate apertures in the first workpiece. Next, the second workpiece must be manipulated such that the bolts extend through appropriate apertures on the second workpiece. Finally, the worker must hold the fastener-carrier in place with one hand while securing the nuts to the mounting bolts. Threading the nuts on the bolts with one hand while supporting the fastener-carrier with another hand can be difficult.

One solution to this problem has been to mount a small retaining clip, commonly known as a "push-on nut" on the shaft of the mounting bolt after the bolt is located in the apertures of the first and second mounting pieces. The push-on nut is retained between the nut and the second mounted piece and remains on the vehicle. One problem with this structure is the additional cost and weight of the push-on nuts. Each push-on nut costs approximately 1 cent and weighs approximately 1 gram. Each automobile utilizes several mounting plates and push-on nuts in mounting one panel to another. Therefore, elimination of the push-on nut would reduce the weight and the cost of each vehicle.

SUMMARY OF INVENTION

The fastener-carrier system according to the invention overcomes the problems of the prior art by providing means to temporarily mount the fastener-carrier member to the first and second plates while the worker secures the nuts on the mounting bolts.

The fastener-carrier system according to the invention comprises a fastener-carrier member and at least one nut. The fastener-carrier member comprises at least one threaded fastener integrally molded into a body portion of the fastener-carrier member. The at least one threaded fastener is selectively received in at least one fastener aperture of the first and second mounted members and is adapted to selectively receive the at least one nut to securely mount the first and second mounted members to one another. The improvement comprises at least one lock member depending from the fastener-carrier member. The lock member is adapted to be received in lock member apertures of the first and second mounted members and temporarily secure the first mounted member with respect to the second mounted member while the at least one nut is threadably mounted on the at least one threaded fastener.

In one embodiment, the at least one locked member comprises a shaft mounted at one end of the fastener carrier member and a body aperture is formed in the fastener carrier member immediately adjacent to one end of the locked member.

In another embodiment, the at least one locked member is mounted to the fastener carrier member closely adjacent to one of the at least one fasteners in order to provide sufficient support for the fastener carrier member as the at least one nut is mounted to the at least one fastener.

In a preferred embodiment, the lock member comprises a shaft having one end mounted to the fastener-carrier member and a snap-locking head mounted on the other end. The snap-locking head comprises a sloped leading edge and a locking edge. The locking edge is substantially perpendicular to the shaft of the lock member.

Preferably, the at least one threaded fastener and at least one lock member are mounted to the fastener-carrier member and the at least one threaded fastener aperture and at least one lock member aperture are formed in the second mounted member such that the sloped leading edge of the lock member engages an edge of the lock member aperture of the second member as the fastener-carrier member is inserted in the second member. The snap-lock head of the lock member is deflected laterally with respect to the shaft of the lock member as the fastener-carrier member is inserted in the second mounted member until the lock member has been inserted a sufficient distance such that the sloped leading edge of the snap-lock head no longer engages the edge of the lock aperture. At this point in time, the amount of deflection of the shaft of the lock member is reduced and the locking edge of the snap-lock head engages an exterior surface of the second mounted member. This locks the first and second members to one another while the nuts are secured to the threaded fasteners.

Preferably, the fastener-carrier system according to the invention comprises two lock members and two threaded fasteners depending from the fastener-carrier member and two lock member apertures and two threaded fastener apertures formed in the first and second mounted members.

The invention also comprises a process of securely fastening a first mounted member to a second mounted member comprising the steps of providing a fastener-carrier member comprising a body portion, at least one threaded fastener depending from the body portion and at least one lock member depending from the body portion. The at least one lock member has a snap-lock head mounted on one end of the shaft of the lock member. The snap-lock head has a sloped leading edge and a locking edge extending substantially perpendicular to the shaft of the lock member. Next, at least one threaded fastener aperture and at least one lock member aperture are provided in the first and second mounted members. The at least one threaded fastener and the at least one lock member are inserted in the threaded fastener aperture and lock member apertures of the first mounted member. Next, the threaded fastener and lock member are inserted in the threaded fastener aperture and lock member aperture, respectively, of the second mounted member such that the sloped leading edge of the snap-lock head engages an edge of the lock member aperture. As the fastener-carrier member is moved relative to the second member, the snap-lock head deflects laterally with respect to the shaft of the lock member. Eventually, the lock member is inserted sufficiently such that the sloped leading edge extends beyond the edge of the lock member aperture. The amount of deflection of the shaft of the lock member is reduced at this point and the locking edge of the snap-lock head engages an exterior surface of the second mounted member. In this position, the first and second members are temporarily mounted to one another. Finally, the nuts are threaded onto the threaded fasteners to securely mount the first and second members to one another.

BRIEF DESCRIPTION OF THE DRAWINGS

The invention will now be described with reference to the drawings in which:

FIG. 1 is a perspective view of a preferred embodiment of a fastener-carrier member according to the invention;

FIG. 2 is a top view of the fastener-carrier member shown in FIG. 1;

FIG. 3 is a bottom view of the fastener-carrier member of FIG. 1;

FIG. 4 is a sectional view of the fastener-carrier member taken along lines 4—4 of FIG. 2;

FIG. 11 is a flow chart of the process of mounting two members to one another utilizing the fastener-carrier system according to the invention.

DESCRIPTION OF THE PREFERRED EMBODIMENTS

Figure 5:
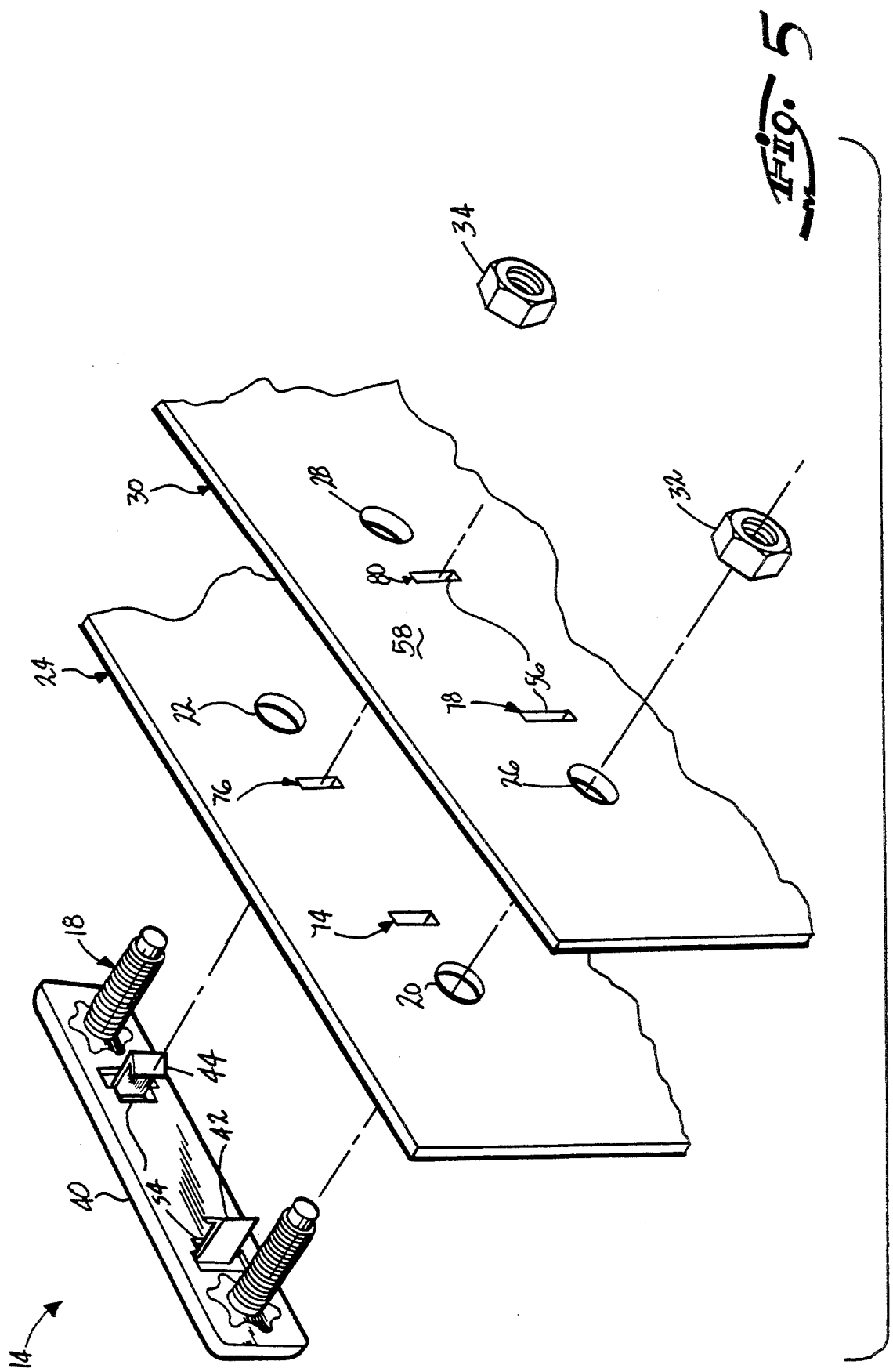
FIG. 5 is an exploded view of the fastener-carrier system according to the invention.
Figure 6:
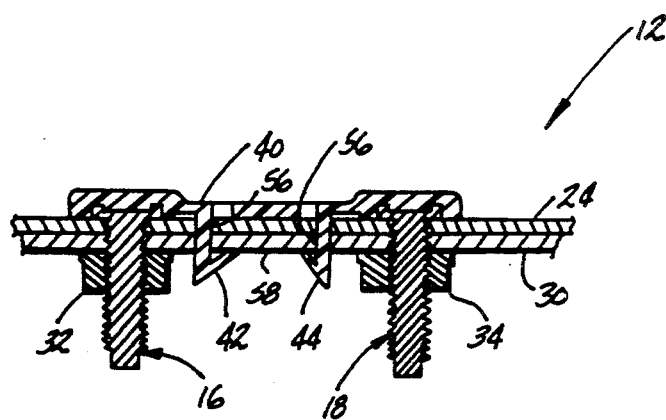
FIG. 6 is an assembly view of the fastener-carrier system according to the invention.

Referring now to the drawings and to FIGS. 1–6, in particular, the fastener-carrier system 12 comprises a fastener-carrier member 14 having at least one mounting bolt mounted thereto which is adapted to threadably receive a nut. Preferably, the fastener-carrier member 14 has a pair of mounting bolts, 16, 18 one mounted adjacent each end of the fastener-carrier member 14. The mounting bolts 16, 18 extend through apertures 20, 22 of the first mounted member 24 and through apertures 26, 28 of the second mounted member 30. A pair of nuts 32, 34 are threaded onto the mounting bolts 16, 18 to fasten the first and second mounted members 24, 30 to one another.

The fastener-carrier member 14 comprises a body portion 40 which supports the two mounting bolts 16, 18. Depending from the body portion 40 of the fastener-carrier member is at least one snap-locking member. Preferably, two snap-locking members 42, 44 are integrally molded into the body portion 40 of the fastener-carrier member 14 and are mounted closely adjacent to the two mounting bolts 16, 18. Each snap-lock member comprises a tapered shaft 46 and a snap-lock head 48 mounted at the terminal end of the shaft 46. The snap-lock head 48 comprises a sloped leading edge 50 extending from the end of the snap-lock head 48 rearwardly and laterally outwardly and a locking edge 52 which extends from one edge of the sloped leading edge 50 inwardly to the tapered shaft 46. A recess 54 is formed in the body portion 40 of the fastener-carrier member 14 immediately adjacent the tapered shaft 46 of the snap-lock member 42. During the molding process for the fastener-carrier member, a conventional sliding core (not shown) extends from one mold half through the recess 54 to the locking edge 52. After the article has been molded, the sliding core is retracted to permit removal of the molded article from the mold.

Figure 7:
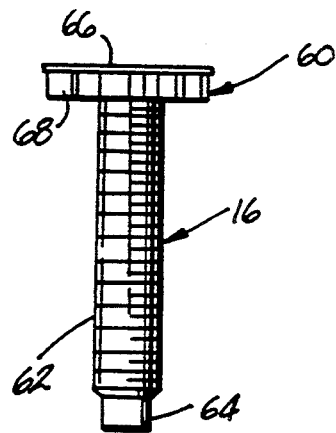
FIG. 7 is a side elevational view of a mounting bolt for use in the fastener-carrier system according to the invention.
Figure 8:
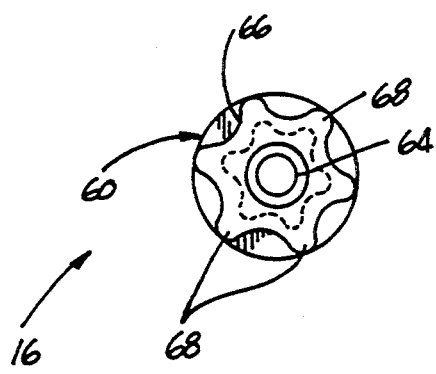
FIG. 8 is a bottom plan view of a bolt for use in the fastener-carrier system according to the invention.

As seen in FIGS. 7 and 8, each mounting bolt 16 comprises a head 60, a shaft 62 extending from the head 60 and a tapered end 64 formed on the end of the shaft opposite from the head 60 of the bolt. The head 60 comprises a circular top flange 66 and a plurality of outwardly extending lobes 68 mounted to the underside of the top flange 66. The particular structure of the head 60 prevents axial or rotational movement of the mounting bolt 16 relative to the fastener-carrier member 14. As described below, the body portion 40 of the fastener-carrier member 14 comprises a molded thermoplastic material. During the molding operation, molten thermoplastic enters the space above and below the top flange 66 and between adjacent lobes 68 of the head 60 and solidifies. The solidified thermoplastic material between adjacent lobes prevents rotation of the bolt 16 relative to the body portion 40 of the fastener-carrier member 14. In addition, the thermoplastic material on either side of the top flange 66 of the head 60 prevents axial movement of the bolt relative to the fastener-carrier member 14. The body portion 40 of the fastener-carrier member 14 is a molded thermoplastic material. Preferably, the mounting bolts are formed of an appropriate metal alloy to provide sufficient strength for securing the first and second mounted members 24, 30 to one another.

The fastener-carrier system 12 according to the invention simplifies the process of mounting two members to one another. As described in the flow chart of FIG. 11, the first step of the mounting process is to insert the mounting bolts 16, 18 into appropriate apertures 20, 22 of the first mounted member 24. At the same time, the snap-lock members 42, 44 are received in apertures 74, 76 of the first mounted member 24. Next, the second mounted member 30 is aligned with the assembly of the fastener-carrier member 14 and the first mounted member 24 such that the mounting bolts 16, 18 are received in the apertures 26, 28 of the second mounted member 30. Concurrently, the snap-lock members 42, 44 are received in apertures 78, 80 of the second mounted member. The snap-lock apertures 78, 80 are positioned such that the sloped leading edge 50 of each snap-lock member 42, 44 engages one edge of the aperture and deflects the resilient snap-lock member 42, 44 laterally relative to the shaft 46 of each member 42, 44 as the snap-lock members 42, 44 are received in the apertures 78, 80. Eventually, the point will be reached where the sloped leading edge 50 extends beyond the edge 56 of the aperture. At this point, the deflected shaft 46 of the snap-lock members 42, 44 will snap back to its unbiased position and locking edge 52 will be snugly positioned behind an exterior surface 58 of the second mounted member 30.

The fastener-carrier member 14 is fully received within the second mounted member 30 when the exposed surface 58 of the fastener-carrier member 14 abuts the first mounted member 24 and the locking flange 48 of each snap-lock member 42, 44 extends past the surface of the second mounted member 30 such that the locking edge 52 of each snap-lock member 42, 44 fits snugly behind the exterior surface 58 of the second mounted member 30 and temporarily retains the assembly of the fastener-carrier member 14, the first mounted member 24 and the second mounted member 30. With the fastener-carrier member 14, first mounted member 24 and second mounted member 30 secured as an assembly by the snap-lock members 42, 44, the worker has both hands free to securely mount the nuts 32, 34 on the threaded shaft 62 of each bolt 16, 18. When the nuts have been securely tightened, the assembly is complete.

The fastener-carrier system 12 according to the invention provides several improvements over the prior art. Namely, the fastener-carrier system according to the invention temporarily mounts the fastener-carrier member 14 and first and second mounted members 24, 30 to one another and frees the worker to use both hands in mounting the nuts 32, 34 to the bolts 16, 18. More importantly, this function is accomplished with a one-piece fastener-carrier member 14, thereby eliminating the need for independent clips or push-on nuts to be mounted on the bolts 16, 18. Therefore, the cost of the fastener-carrier member 14 is reduced by the elimination of these independent push-on nuts. In addition, the fastener-carrier member 14 including locking tabs 42, 44 according to the invention weighs less than a comparable fastener-carrier member which utilizes push-on nuts. Therefore, the weight of the overall system is reduced by the elimination of the push-on clips. Still another advantage lies in the process of mounting the first and second mounted members to one another by eliminating the push-on clips. The worker is no longer required to insert the fastener-carrier member, locate two individual push-on nuts and then mount each push-on nut on each bolt of the fastener-carrier member with one hand while holding the assembly together with the other hand. Once the worker has inserted the fastener-carrier member 14 according to the invention in the appropriate apertures of the first and second mounted member 24, 30, then the temporary retaining assembly is complete and the worker has both hands free to properly secure the nuts on the threaded fasteners.

As noted above, the fastener-carrier member 14 and snap-lock members 42, 44 are preferably formed of a molded thermoplastic material which typically has a limited strength. Therefore, the snap-lock members 42, 44 in the assembled position with the first and second mounted members 24, 30 provides a limited amount of strength for retaining the assembly. However, the strength provided by the structure according to the invention is sufficient to temporarily retain the assembly while a worker mounts nuts 32, 34 on the mounting bolts 16, 18 which provides a significantly higher strength level in retaining the assembly.

Figure 9:
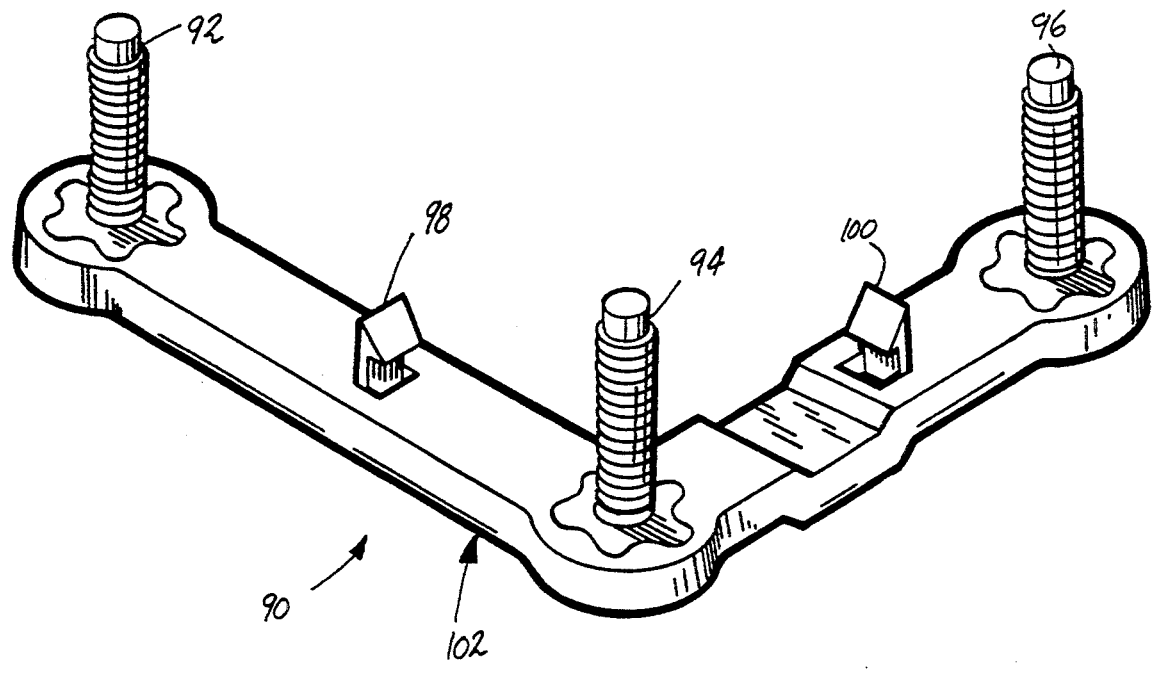
FIG. 9 is a perspective view of a second embodiment of a fastener-carrier member according to the invention.

FIG. 9 depicts a perspective view of a second embodiment of the fastener-carrier member according to the invention. In this embodiment, the fastener-carrier member 90 includes three mounting bolts 92, 94, 96 and a pair of snap-lock members 98, 100. In this case, the body portion 102 of the fastener-carrier member 90 is L-shaped and the mounting bolts 92, 94, 96 are mounted at the terminal ends of the two legs, 104, 106 of the L-shaped member and at the junction between the two legs, 104, 106. The snap-lock members 98, 100 are mounted intermediate the two legs 104, 106 of the fastener-carrier member 90. The body 102 of the fastener-carrier member can be contoured and manipulated to suit the particular needs for the assembly.

Figure 10:
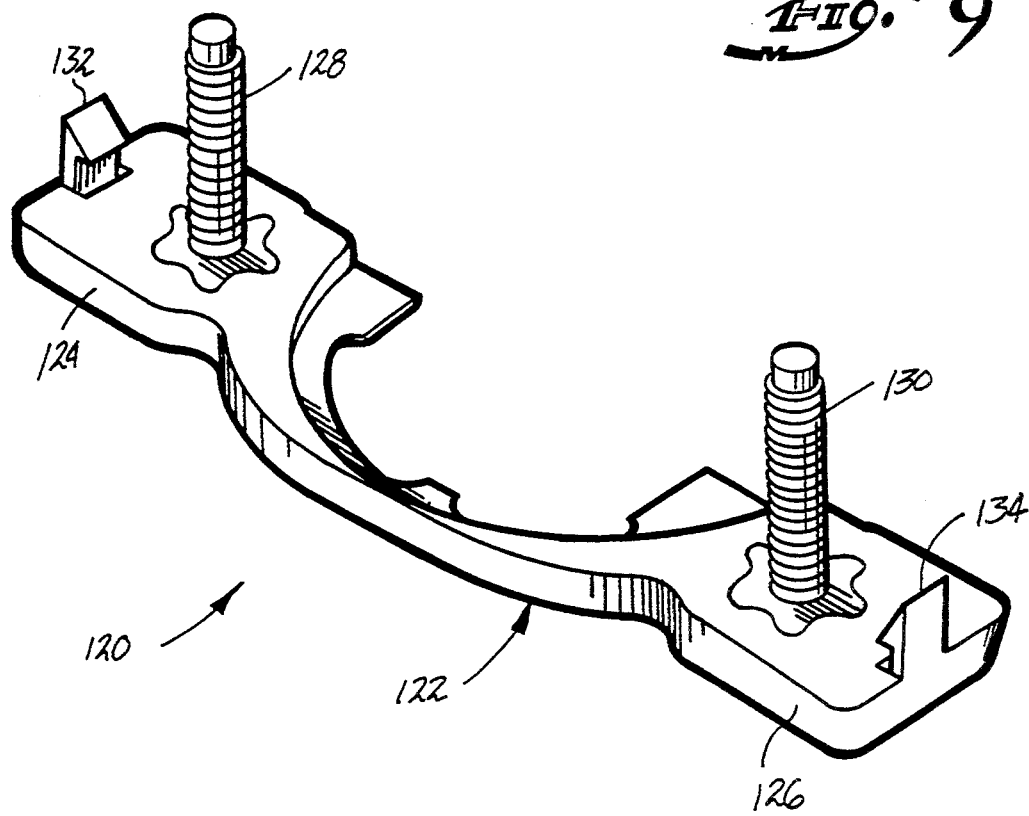
FIG. 10 is a perspective view of a third embodiment of a fastener-carrier member according to the invention.

A third embodiment of the fastener-carrier member 120 is depicted in FIG. 10. In this embodiment, the body portion 122 of the fastener-carrier member 120 is U-shaped and a pair of end positions 124, 126 extend laterally outwardly therefrom. A pair of mounting bolts 128, 130 depend from the flanges 124, 126. A pair of snap-lock members 132, 134 depend from the terminal ends of the end portions 124, 126.

The second embodiment as seen in FIG. 9 and third embodiment of the fastener-carrier member as seen in FIG. 10 are mounted in the same manner as described above for the first embodiment.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

The embodiments of the invention in which an exclusive property or privilege is claimed are defined as follows:

1. A fastener-carrier system for mounting first and second mounted members to one another comprising a fastener-carrier member and at least one nut, the fastener-carrier member comprising at least one threaded fastener integrally molded into a body portion of the fastener-carrier member, the at least one threaded fastener being selectively received in at least one fastener aperture of the first and second mounted members and adapted to selectively receive the at least one nut to securely mount the first and second mounted members to one another, the improvement comprising;

at least one lock member depending from the fastener-carrier member and adapted to be received in lock member apertures of the first and second mounted members and temporarily secure the first mounted member with respect to the second mounted member while the at least one nut is threadably mounted on the at least one threaded fastener, the at least one lock member comprising a shaft mounted at one end to the fastener carrier member; and a body aperture formed in the fastener carrier member immediately adjacent one end of the lock member.

2. A fastener-carrier system according to claim 1 wherein the at least one threaded fastener and nut are metallic and the body of the fastener-carrier member comprises a molded thermoplastic material.

3. A fastener-carrier system according to claim 1 wherein the lock member further comprises a snap-locking head mounted on the other end of the shaft, the snap-looking head comprises a sloped leading edge and a locking edge, the locking edge being substantially perpendicular to the shaft of the lock member.

4. A fastener-carrier system according to claim 3 and further comprising a recess in the body of the fastener-carrier member adjacent the one end of the shaft of the lock member, the recess and body aperture being formed in the fastener-carrier member on opposite sides of the shaft of the lock member.

5. A fastener-carrier system according to claim 3 wherein the shaft of the lock member is flexible relative to the body of the fastener-carrier member.

6. A fastener-carrier system according to claim 3 wherein the shaft of the lock member is tapered such that the one end is thicker in cross section than the other end.

7. A fastener-carrier system according to claim 3 wherein the at least one threaded fastener and the at least one lock member are mounted to the fastener-carrier member and the at least one threaded fastener aperture and the at least one lock member aperture are formed in the second mounted member such that the sloped leading edge of the at least one lock member bears against an edge of the lock member aperture of the second mounted member and the snap-lock head of the lock member is deflected laterally with respect to the shaft of the lock member and the fastener-carrier member is inserted in the second mounted members until the lock member has been inserted a sufficient distance such that the sloped leading edge of the snap-lock head no longer engages the edge of the lock aperture at which time the amount of deflection of the shaft of the lock member is reduced and the locking edge of the snap-lock head bears against an exterior surface of the second mounted member thereby locking the first and second mounted members to one another while the at least one nuts are secured to the at least one threaded fasteners.

8. A fastener-carrier system according to claim 7 and further comprising two lock members and two lock member apertures formed in the first and second mounted members.

9. A fastener-carrier system according to claim 8 and further, comprising two threaded fasteners, two nuts and two threaded fastener apertures.

10. A fastener-carrier system according to claim 8 and further comprising three threaded fasteners, three nuts and three threaded fastener apertures.

11. A process of securely fastening a first mounted member to a second mounted member comprising the steps of;
providing a fastener-carrier member comprising a body portion, at least one threaded fastener depending from the body portion and at least one lock member depending from the body portion, the at least one lock member having a snap-lock head mounted on one end of a shaft of the lock member, the snap-lock head having a sloped leading edge and a locking edge extending substantially perpendicular to the shaft of the lock member;
providing at least one threaded fastener aperture and at least one lock member aperture in the first and second mounted members;
inserting the at least one threaded fastener and the at least one lock member in the at least one threaded fastener aperture and lock member aperture, respectively, of the first mounted member;
inserting the at least one threaded fastener and the at least one lock member in the at least one threaded fastener aperture and lock member aperture, respectively, of the second mounted member such that the sloped leading edge of the snap-lock head bears against an edge of the lock member aperture and deflects the shaft of the lock member laterally with respect to the shaft of the lock member until the sloped leading edge positioning extends beyond the edge of the lock member aperture, the locking edge of the snap-lock head behind an exterior surface of the second mounted member, thereby temporarily securing the first mounted member to the second mounted member; and
mounting the at least one nut to the at least one threaded fastener to securely mount the first and second members to one another.

12. A fastener-carrier system for mounting first and second mounted members to one another comprising a fastener-carrier member and at least one nut, the fastener-carrier member comprising at least one threaded fastener integrally molded into a body portion of the fastener-carrier member, the at least one threaded fastener being selectively received in at least one fastener aperture of the first and second mounted members and adapted to selectively receive the at least one nut to securely mount the first and second mounted members to one another, the improvement comprising;
at least one lock member depending from the fastener-carrier member and adapted to be received in lock member apertures of the first and second mounted members and temporarily secure the first mounted member with respect to the second mounted member while the at least one nut is threadably mounted on the at least one threaded fastener, the at least one lock member being mounted to the fastener-carrier member closely adjacent to one of said at least one fastener in order to provide sufficient support for the fastener carrier member as the at least one nut is mounted to the at least one fastener.

13. A fastener-carrier system according to claim 12 wherein the at least one threaded fastener and nut are metallic and the body of the fastener-carrier member comprises a molded thermoplastic material.

14. A fastener-carrier system according to claim 12 wherein the lock member comprises a shaft having one end mounted to the fastener-carrier member and a snap-locking head mounted on the other end, the snap-locking head comprising a sloped leading edge and a locking edge, the locking edge being substantially perpendicular to the shaft of the lock member.

15. A fastener-carrier system according to claim 14 wherein the shaft of the lock member is flexible relative to the body of the fastener-carrier member and the sloped leading edge of the snap-locking head extends outwardly from a first side of the shaft, whereby the shaft is deflected laterally in a direction opposite the first side of the shaft as the sloped leading edge engages an edge of the fastener aperture of the first and second mounted members.

16. A fastener-carrier system for mounting first and second mounted members to one another comprising a fastener-carrier member and at least one nut, the fastener-carrier member comprising at least one threaded fastener integrally molded into a body portion of the fastener-carrier member, the at least one threaded fastener being selectively received in at least one fastener aperture of the first and second mounted members and adapted to selectively receive the at least one nut to securely mount the first and second mounted members to one another, the improvement comprising;
at least one lock member depending from the fastener-carrier member and adapted to be received in lock member apertures of the first and second mounted members and temporarily secure the first mounted member with respect to the second mounted member while the at least one nut is threadably mounted on the at least one threaded fastener, the at least one look member comprising a flexible shaft having a longitudinal axis, one end of the shaft being mounted to the fastener-carrier member and a looking head mounted to the other end, the at least one lock member being aligned with the at least one threaded fastener and apertures in the first and second mounted members such that the flexible shaft of the at least one lock member is deflected laterally relative to the longitudinal axis of the shaft as the shaft and locking head are inserted in the lock member apertures of the first and second mounted members.

17. A fastener-carrier system according to claim 16 and further comprising a body aperture formed in the fastener carrier member immediately adjacent one end of the lock member.

18. A fastener-carrier system according to claim 16 wherein the shaft of the lock member is tapered such that the one end is thicker in cross section than the other end.

19. A fastener-carrier system according to claim 16 wherein the at least one lock member is mounted to the fastener-carrier member closely adjacent to one of said at least one fastener in order to provide sufficient support for the fastener carrier member as the at least one nut is mounted to the at least one fastener.

20. A fastener-carrier system according to claim 16 and further comprising two lock members and two lock member apertures formed in the first and second mounted members.

* * * * *

UNITED STATES PATENT AND TRADEMARK OFFICE
CERTIFICATE OF CORRECTION

PATENT NO.   : 5,407,310
DATED        : April 18, 1995
INVENTOR(S)  : Haig H. Kassouni It is certified that error appears in the above-indentified patent and that said Letters Patent is hereby corrected as shown below:

Claim 7, column 7, line 13;
"and" should be --as--.

Claim 16, column 8, line 66;
"look" should be --lock--.

Claim 16, column 9, line 1;
"looking" should be --locking--.

Signed and Sealed this

Thirty-first Day of October 1995

Attest:

BRUCE LEHMAN

Attesting Officer

Commissioner of Patents and Trademarks